(12) United States Patent
Li et al.

(10) Patent No.: US 8,068,257 B2
(45) Date of Patent: Nov. 29, 2011

(54) COLOR PRINTING REDUCING ARTIFACTS AND BANDING BY RENDERING BLACK DOTS, REPLACING DOTS WITH PROCESS BLACK, AND ADDING NON-BLACK DOTS FOR DIFFERENT SUBSETS OF BLACK DOTS

(75) Inventors: Xing Li, Webster, NY (US); Francis K. Tse, Rochester, NY (US); Zhenhuan Wen, Pittsford, NY (US); David J. Metcalfe, Marion, NY (US)

(73) Assignee: Xerox Corp., Norwalk, CT (US)

( * ) Notice: Subject to any disclaimer, the term of this patent is extended or adjusted under 35 U.S.C. 154(b) by 510 days.

(21) Appl. No.: 12/390,583

(22) Filed: Feb. 23, 2009

(65) Prior Publication Data
US 2010/0214341 A1    Aug. 26, 2010

(51) Int. Cl.
*H04N 1/52* (2006.01)
*H04N 1/58* (2006.01)
*H04N 1/034* (2006.01)
*B41J 2/205* (2006.01)

(52) U.S. Cl. ........ 358/1.9; 358/3.26; 358/502; 358/534; 347/15

(58) Field of Classification Search .................... 358/1.9, 358/3.06, 3.09, 3.26, 502, 534; 347/12, 15, 347/43
See application file for complete search history.

(56) References Cited

U.S. PATENT DOCUMENTS

| | | | | |
|---|---|---|---|---|
| 5,568,169 | A * | 10/1996 | Dudek et al. | 347/15 |
| 5,767,876 | A * | 6/1998 | Koike et al. | 347/43 |
| 6,250,733 | B1 * | 6/2001 | Yao et al. | 347/15 |
| 6,290,330 | B1 * | 9/2001 | Torpey et al. | 347/15 |
| 7,040,730 | B2 | 5/2006 | Yao et al. | |
| 7,048,349 | B2 | 5/2006 | Yao et al. | |
| 7,095,530 | B2 | 8/2006 | Mantell | |
| 2002/0176105 | A1 * | 11/2002 | Kawai et al. | 358/1.9 |
| 2003/0011794 | A1 * | 1/2003 | Yao et al. | 358/1.9 |
| 2003/0202193 | A1 * | 10/2003 | Yokochi | 358/1.9 |

* cited by examiner

*Primary Examiner* — Scott A Rogers
(74) *Attorney, Agent, or Firm* — Fay Sharpe LLP

(57) ABSTRACT

A method of printing comprising setting a pixel black value of K for an ink limit and identifying each of black dots of a first subset of black dots having pixel black value K greater than the ink limit, and pixel color value of cyan, magenta, and yellow equal to zero. The method further comprises rendering only K for a pixel value for the first subset of black dots and replacing each of black dots of a second subset of black dots of a halftoned bit map for a predetermined area with a process black dot. The method still further comprises adding a non-black dot to each of black dots of a third subset of black dots of the bit-mapped data, wherein the halftoned bit map is generated by halftoning continuous tone data; wherein the black dots of the third subset comprises a percentage of all the black dots that tends to generally increase as a ratio of black coverage to total coverage in the predetermined area increases; wherein the first, second, and third subset comprises black dots that are mutually exclusive; and, printing the bit map.

13 Claims, 4 Drawing Sheets

| 184 | 11 | 224 | 51 | 252 | 17 | 114 | 241 | 128 | 79 | 22 | 140 | 57 | 215 | 160 | 49 |
|---|---|---|---|---|---|---|---|---|---|---|---|---|---|---|---|
| 236 | 69 | 133 | 107 | 170 | 70 | 196 | 38 | 155 | 191 | 228 | 90 | 185 | 104 | 27 | 86 |
| 115 | 163 | 40 | 209 | 2 | 142 | 96 | 220 | 73 | 119 | 55 | 162 | 13 | 254 | 141 | 208 |
| 8 | 187 | 244 | 81 | 183 | 238 | 29 | 171 | 12 | 246 | 35 | 205 | 126 | 43 | 177 | 61 |
| 145 | 101 | 23 | 154 | 116 | 52 | 137 | 201 | 103 | 147 | 181 | 85 | 230 | 76 | 111 | 239 |
| 44 | 217 | 63 | 229 | 32 | 210 | 92 | 59 | 225 | 66 | 123 | 9 | 151 | 212 | 16 | 194 |
| 82 | 122 | 178 | 132 | 74 | 172 | 253 | 5 | 165 | 42 | 240 | 199 | 98 | 50 | 130 | 159 |
| 30 | 251 | 3 | 202 | 106 | 18 | 143 | 113 | 197 | 138 | 78 | 33 | 175 | 247 | 65 | 222 |
| 169 | 88 | 152 | 46 | 237 | 189 | 67 | 219 | 25 | 105 | 214 | 156 | 121 | 4 | 186 | 109 |
| 203 | 53 | 221 | 124 | 77 | 158 | 39 | 95 | 168 | 245 | 14 | 68 | 233 | 93 | 148 | 20 |
| 97 | 136 | 15 | 176 | 34 | 213 | 135 | 234 | 45 | 87 | 146 | 193 | 37 | 207 | 48 | 243 |
| 60 | 232 | 192 | 94 | 250 | 108 | 0 | 190 | 125 | 206 | 58 | 112 | 164 | 83 | 131 | 179 |
| 1 | 157 | 72 | 26 | 153 | 54 | 166 | 75 | 21 | 161 | 226 | 10 | 255 | 24 | 223 | 117 |
| 91 | 211 | 127 | 235 | 118 | 200 | 227 | 100 | 248 | 47 | 134 | 182 | 99 | 149 | 56 | 195 |
| 249 | 62 | 19 | 180 | 41 | 84 | 28 | 144 | 188 | 110 | 71 | 36 | 204 | 80 | 174 | 31 |
| 102 | 150 | 198 | 89 | 139 | 216 | 173 | 64 | 6 | 218 | 167 | 242 | 120 | 7 | 231 | 129 |

*FIG. 6*

COLOR PRINTING REDUCING ARTIFACTS AND BANDING BY RENDERING BLACK DOTS, REPLACING DOTS WITH PROCESS BLACK, AND ADDING NON-BLACK DOTS FOR DIFFERENT SUBSETS OF BLACK DOTS

BACKGROUND

The subject disclosure is generally directed to reducing artifacts and banding in color printing.

Color printers typically employ a plurality of inks of different primary colors to generate a spectrum of colors. For example, many color printers use four ink colors: cyan (C), magenta (M), yellow (Y) and black (K). Color images are formed on a receiving substrate or medium by placing combinations of zero or more dots of C, M, Y or K ink at each pixel location. However, since dot placement can be less than ideal, various artifacts such as banding can occur.

On solid ink printers, jet to jet variation can be the main cause of banding. Differences in dot position errors between the jets cause black dots to overlap adjacent color dots more in some printed columns than others. For the locations where there is more black overlapping, the color will lose more chroma. Different amounts of black overlapping produce different colors, resulting in vertical colored bands.

CROSS REFERENCE TO RELATED PATENTS AND APPLICATIONS

The following disclosure may be relevant to various aspects of the present disclosure: U.S. Pat. No. 7,048,349 to Yao et al., issued on May 23, 2006; the disclosure of which is incorporated herein by reference.

BRIEF DESCRIPTION

Aspects of the present disclosure in embodiments thereof include a method of printing comprising setting a pixel black value of K for an ink limit and identifying each of black dots of a first subset of black dots having pixel black value K greater than the ink limit, and pixel color value of cyan, magenta, and yellow equal to zero. The method further comprises rendering only K for a pixel value for the first subset of black dots and replacing each of black dots of a second subset of black dots of a halftoned bit map for a predetermined area with a process black dot. The method still further comprises adding a non-black dot to each of black dots of a third subset of black dots of the bit-mapped data, wherein the halftoned bit map is generated by halftoning continuous tone data; wherein the black dots of the third subset comprises a percentage of all the black dots that tends to generally increase as a ratio of black coverage to total coverage in the predetermined area increases; wherein the first, second, and third subset comprises black dots that are mutually exclusive; and, printing the bit map.

Other aspects of the present disclosure in embodiments thereof include a method of printing comprising setting a pixel black value of K for an ink limit and identifying each of black dots of a first subset of black dots having pixel black value K greater than the ink limit, and pixel color value of cyan, magenta, and yellow equal to zero. The method further comprises rendering only K for a pixel value for the first subset of black dots and replacing each of black dots of a second subset of black dots of a bit map for a predetermined area with a process black dot. The method still further provides adding a non-black dot to each of black dots of a third subset of black dots of the bit-mapped data; wherein the first, second, and third subset comprise black dots that are mutually exclusive subsets; and, printing the bit map.

Another aspect of the present disclosure includes a method of printing comprising setting a pixel black value of K for an ink limit and identifying each of black dots of a first subset of black dots having pixel black value K greater than the ink limit, and pixel color value of cyan, magenta, and yellow equal to zero. The method further comprises rendering only K for a pixel value for the first subset of black dots and replacing each of black dots of a second subset of black dots of a halftoned bit map for a predetermined area with a process black dot. And still further the method further comprises adding at least a cyan dot to each of black dots of a third subset of black dots of the halftoned bit-map; adding at least a magenta dot to each of black dots of a fourth subset of black dots of the halftoned bit-map; adding at least a yellow dot to each of black dots of a fifth subset of black dots of the halftoned bit-map; and, wherein the halftoned bit map is generated by halftoning continuous tone data and wherein the black dots of the third subset, the fourth subset and the fifth subset comprises a percentage of all the black dots that tends to generally increase as a ratio of black coverage to total coverage in the predetermined area increases. And the method further provides for printing the bit map.

Still a further aspect of the present disclosure includes a method of printing comprising modifying continuous tone data for a predetermined area such that halftoning of the modified continuous tone data produces a halftoned bit map wherein a pixel black value of K for an ink limit is set and each of black dots of a first subset of black dots is identified having pixel black value K greater than the ink limit, and pixel color value of cyan, magenta, and yellow equal to zero. The method further comprises rendering only K for a pixel value for the first subset of black dots wherein each of black dots of a second subset of black dots is replaced with a process black dot; a cyan dot is added to each of black dots of a third subset of black dots; a magenta dot is added to each of black dots of a fourth subset of black dots; and, a yellow dot is added to each of black dots of a fifth subset of black dots. The method further comprises halftoning the modified continuous tone data to produce halftoned bit map; and, printing the bit map.

DETAILED DESCRIPTION

Figure 1:
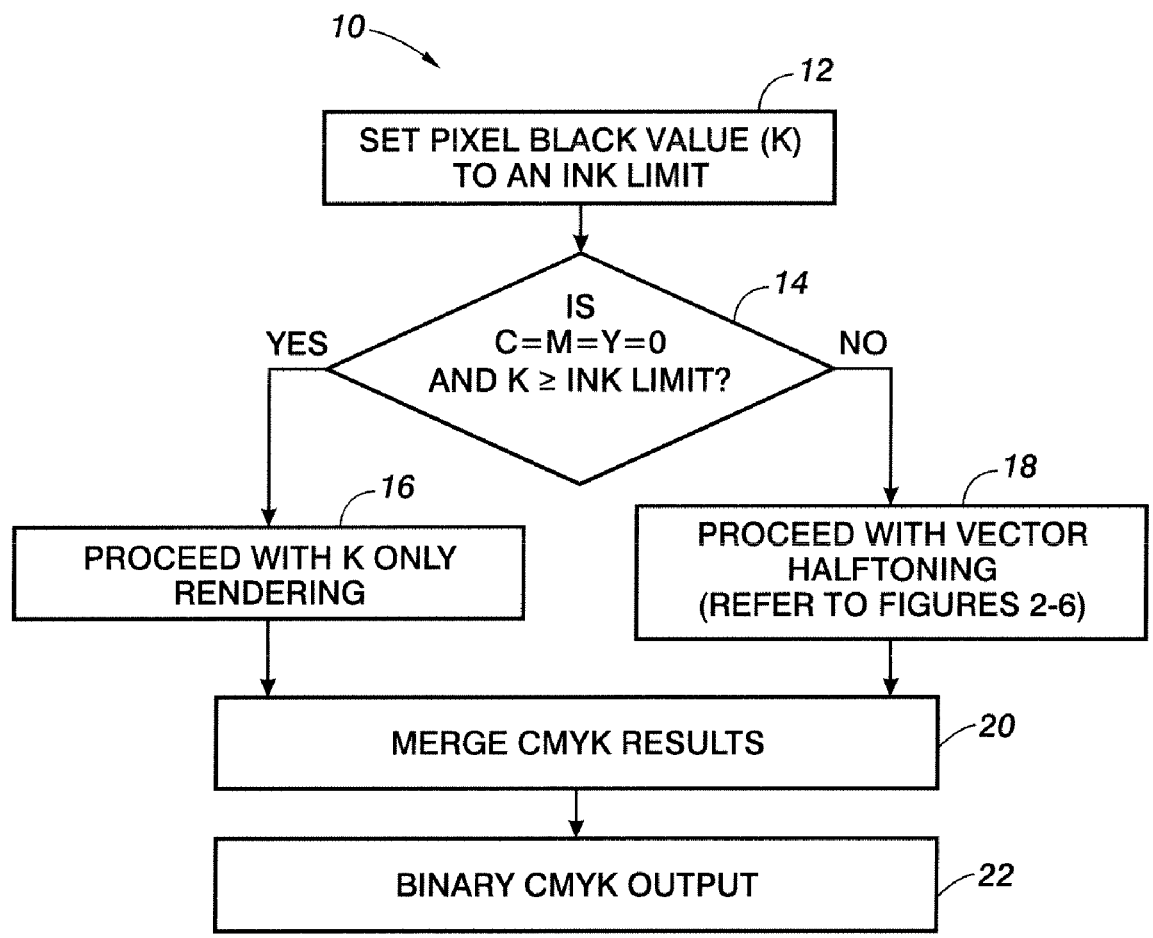
FIG. 1 is a flow chart for detecting and processing non-black and black only (or substantially black) pixels.

FIG. 1 outlines a flow chart which proposes detecting black dots or pixels 10 having a fully-on black pixel value (i.e. K=250, or some other determinable value limit 12) and then prevents adding color to those particular pixel locations to compensate for banding. The proposed apparatus and method, to be described hereinafter, avoids the need for the post-processing step of removing the color additions in solid black areas. As outlined, a pixel black value (K) can be set to a predeterminable ink limit 12. If the Cyan (C), Magenta (M), and Yellow (Y) are equal to zero (0), and the black pixel value (K) is greater than or equal to the predeterminable ink limit 14, then the process proceeds with K only rendering 16 of pixel values. If the C, M, and Y are not equal to zero (0), then proceed with vector halftoning 18 (refer to FIGS. 2-6). Subsequent to either processing steps 16, 18, the CMYK results are merged 20 and a binary CMYK output is produced 22.

Figure 2:
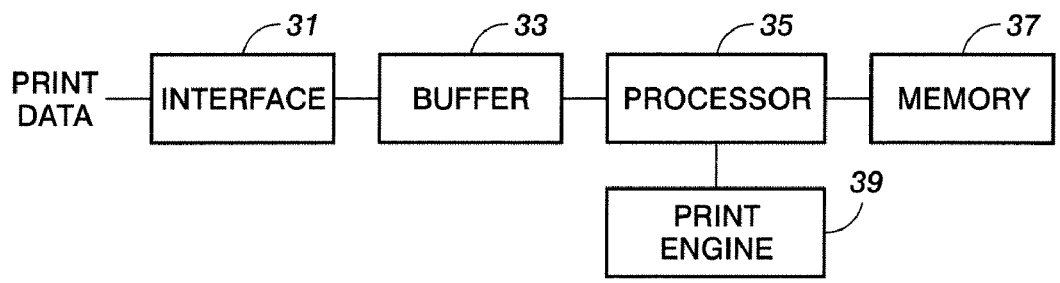
FIG. 2 is a schematic block diagram of an embodiment of a printing system.

FIG. 2 is a schematic block diagram of an embodiment of a printing apparatus that includes an interface 31 that receives print data, for example from a host computer, and stores the print data in a buffer memory 33. A processor 35 is configured to process the print data to produce bit mapped raster data that is stored in a memory 37. A print engine 39 prints an image pursuant to the bit mapped raster data generated by the processor 35. The print engine 39 can be an electrophotographic print engine or an ink jet print engine, for example.

Printing is accomplished by selectively printing, depositing, applying or otherwise forming markings such as dots on a receiver surface or substrate that can be a print output medium such as paper or a transfer surface such as a transfer belt or drum. If a transfer surface is used, the image formed or printed on the transfer surface is appropriately transferred to a print output medium such as paper.

Figure 3:
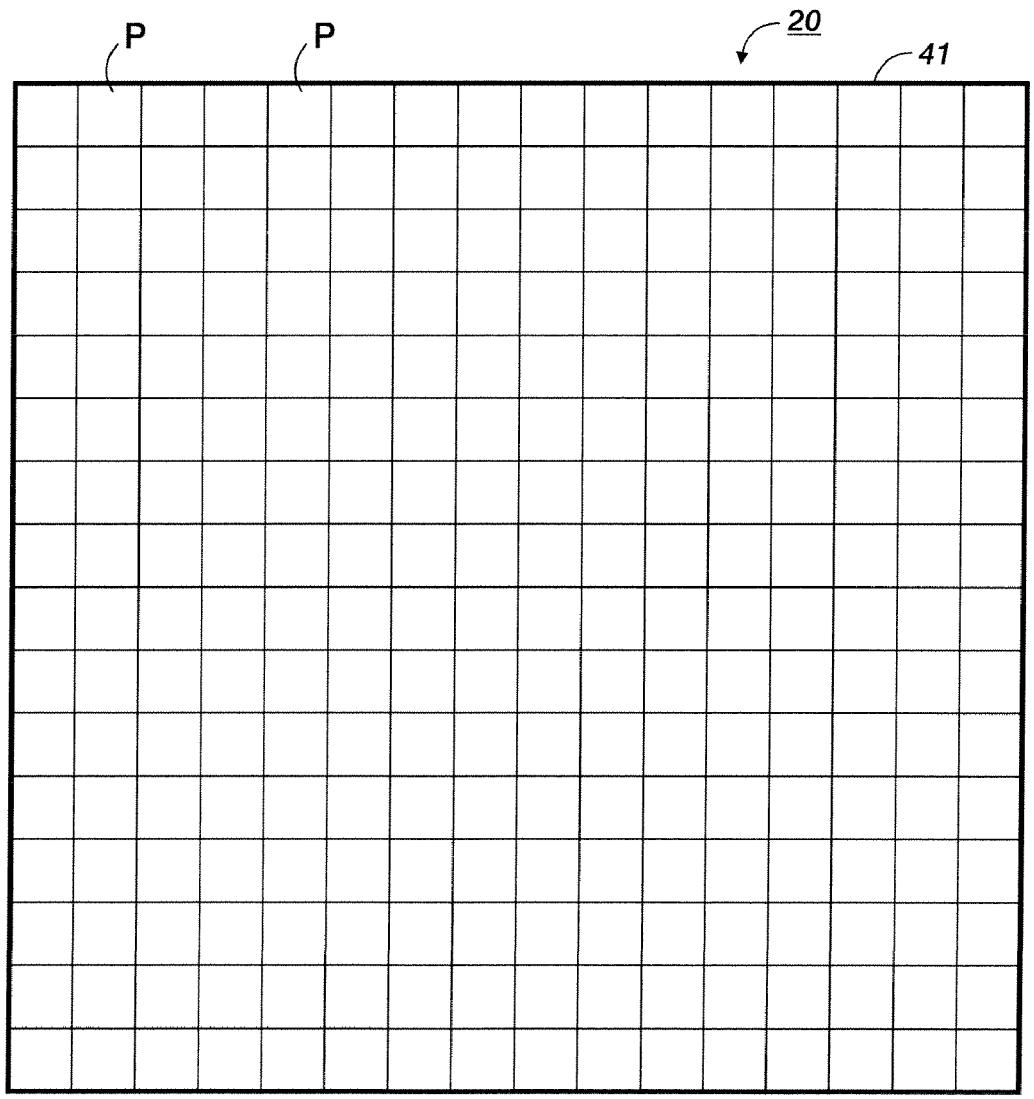
FIG. 3 is a schematic illustration of an embodiment of a pixel array.

FIG. 3 is a schematic illustration of an embodiment of an array 20 of pixel locations P that can be used to define the locations on a print output medium 41 that can be marked or printed. A marking of a particular primary color (e.g., cyan magenta, yellow or black) that is printed or deposited at a pixel location can be conveniently called a dot.

Each pixel location P can, for example, be marked or printed with (a) one or more non-black color dots (e.g., cyan, magenta or yellow), (b) a black dot by itself, or (c) a black dot and at least one non-black color dot.

Print data typically comprises continuous tone data (such as 32-bit or 24-bit pixel data), and halftoning (e.g., using one or more halftone threshold arrays) is commonly employed to map or transform continuous tone data to a halftoned bit map that contains one bit per pixel per primary color plane, for example. In this disclosure, it is contemplated that some of the black dots in the halftoned bit map are replaced with a process black dot, while one or more non-black dots is added to each of other black dots in the halftoned bit map. A process black dot comprises for example a combination of a cyan dot, a magenta dot and a yellow dot. A combination of a black dot and at least one non-black dot can be conveniently called a black plus non-black dot, and can comprise for example a black dot and a single non-black dot, or a black dot and a plurality of non-black dots. In this manner, some black dots are replaced with process black dots, while other black dots are replaced with black plus non-black dots.

In one application for reducing tertiary banding in ink jet printing, cyan, magenta, or yellow dots can be placed underneath each black dot or the black dots can be replaced with CMY dots. This process can reduce color banding. When color is added to K (i.e. black) only elements, then jet registration differences can add a color fringe to those elements. In such areas the added color dots can be subsequently removed using a small area context detection. This can introduce defects and negatively impact cost and performance.

The process to be described hereinafter provides for a system and method to remove tertiary banding and other artifacts in a manner that prevents adding color dots to fully on (i.e. K=255), or substantially fully on (i.e. K>90% of 255) black pixels, or other pixels having an ink limit value that is a certain percentage (or more) of the fully on value, thereby avoiding a post-processing step to at least one subset of image pixels.

In an initial step, fully on, and substantially fully on, black pixels are detected and identified as a first subset. Fully on, and substantially fully on, black pixels can be identified where the K value is greater than or equal to an ink limit, or high enough black only content, (i.e. K>90% of 255, or other predeterminable limit/percentage) and C=M=Y=0 upstream from the pixel location. The fully on black pixels can then be excluded from adding color to, or underneath, these areas. This avoids the post screening step, to be described hereinafter, and thus provides enhanced benefits for solid ink banding reduction.

Post-processing can force the removal of some of the color behind the black pixels where it is not intended, thereby reducing the effectiveness of the post processing algorithm. In particular, in dark areas where there could be adjacent black pixels and in the enhanced mode (i.e. 600×600 marking mode), there are white 'holes' causing color to be removed from adjacent black pixels.

The algorithm described herein, refers to FIG. 1, avoids placing color under pure, or substantially pure, solid black for graphical/text objects. It is to be appreciated that the design of the color table for image objects be such that the substantially pure K point at or greater than the ink limit, substantial ink limit, or high enough black only content (i.e. K>predeterminable limit), is identified.

Figure 4:
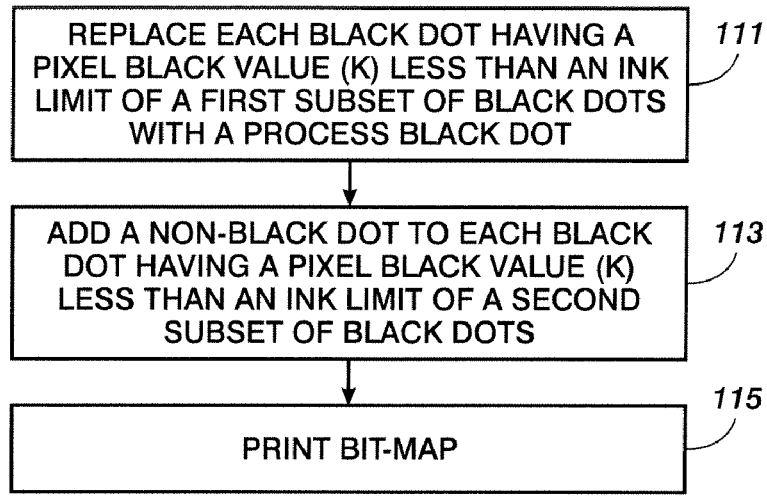
FIG. 4 is a schematic flow diagram of an embodiment of a procedure for printing black pixels.

FIG. 4 is a schematic flow diagram of an embodiment of a procedure for printing black pixels. At 111 each of the black dots having a pixel black value (K) less than an ink limit of a first subset of the black dots of a bit map for a predetermined area is replaced with a process black dot. At 113 a non-black dot is added to each of the black dots having a pixel black value (K) less than an ink limit of a second subset of the black dots of the bit map for the predetermined area. At 115 the bit map is printed.

The black dots of the first subset (which are replaced with process black dots) can comprise a percentage of all the black dots that tends to generally decrease as the ratio of black coverage to total coverage in the predetermined area increases. Also, the black dots of the second subset (to which a non-black dot is added) can comprise a percentage of all the black dots that tends to generally increase as the ratio of black coverage to total coverage in the predetermined area increases.

By way of illustrative example, the first and second subsets can be mutually exclusive so as to be non-overlapping. In other words, each subset comprises black dots that are not in the other subset. Also, the combination of the first and second subsets can comprise all or less than all of the black dots, whereby some of the black dots are not replaced with black dots and do not have a non-black dot added thereto.

A second subset, identified as black dots having a K value less than the ink limit (i.e. K<predeterminable limit) can be replaced with process black dots and can be generally uniformly distributed. Similarly, the black dots to which a non-black dot is added can be uniformly distributed. For example, a stochastic halftone threshold array or screen can be conveniently employed.

By way of illustrative example, determining whether a black dot is replaced with a process black dot or has a non-black dot added to it can be accomplished by halftoning continuous tone print data wherein each of the black values in the corresponding continuous tone data has been replaced with (a) a black plus non-black value KCMY that has been determined as a function of the relative amount or coverage of black in the continuous tone data, e.g., the ratio of black coverage to total color coverage, and (b) a process black value cmy that comprises the difference between the black value and the black plus non-black value.

For the illustrative example of a CMYK device that provides for eight possible colors for a pixel, total continuous tone color coverage for a pixel comprises:

$$TOTAL=bk+cm+cy+my+c+m+y$$

wherein bk=black, cm=blue (cyan+magenta), cy=green (cyan+yellow), my=red magenta+yellow), c=cyan, m=magenta, y=yellow.

The relative amount of black coverage is:

$$BK\_REL=bk/TOTAL$$

For the illustrative example wherein color values and coverage comprise scalars in the range of 0 to 255, the relative amount of black can be scaled to [0, 255]:

$$BK\_SCALED=(bk/TOTAL)*255$$

The relative amount of black (BK_REL or BK_SCALED) can be used to index a look-up table that returns a black plus non-black value KCMY:

$$KCMY=TABLE\ [BK\_SCALED]$$

The black plus non-black value can increase as the relative amount of black BK_SCALED increases. For example, the black plus non-black value KCMY can be a linear function of the relative amount of black, or KCMY can be sigmoid function of the relative amount of black.

The process black value cmy can comprise the difference between the black value bk and the black plus non-black value KCMY:

$$cmy=bk-KCMY$$

For the illustrative example wherein bk and KCMY are scalars. In this manner, the process black value cmy decreases as the relative amount of black coverage increases.

The modified continuous tone data is halftoned, for example to distribute the replacement process black dots and the black dots to which a non-black dot has been added. For the illustrative example wherein the color values, the black plus non-black values KCMY, and the process black values cmy, and the threshold values are scaled to the same range such as [0, 255], the replacement process black dots can be printed at pixel locations having associated threshold values in the range of 0 to cmy−1, and the black dots and additional non-black dots can be printed at pixel locations having associated threshold values in the range of cmy to cmy+KCMY−1, for example. As described further herein the black dots to which a particular non-black color dot is added can also be generally uniformly distributed, for example by use of a stochastic halftone threshold value array. In this manner, for an area of uniform color, the black plus non-black value KCMY generally represents the portion of black dots in the area to which non-black dots are added, while the process black value cmy represents the portion of black dots in the area that are replaced with process black dots. To the extent that KCMY and cmy are scalars in the range [0, 255], KCMY/255 would be the fraction of black dots to which non-black dots are added while cmy/255 would be the fraction of black dots that are replaced with process black dots.

Figure 5:
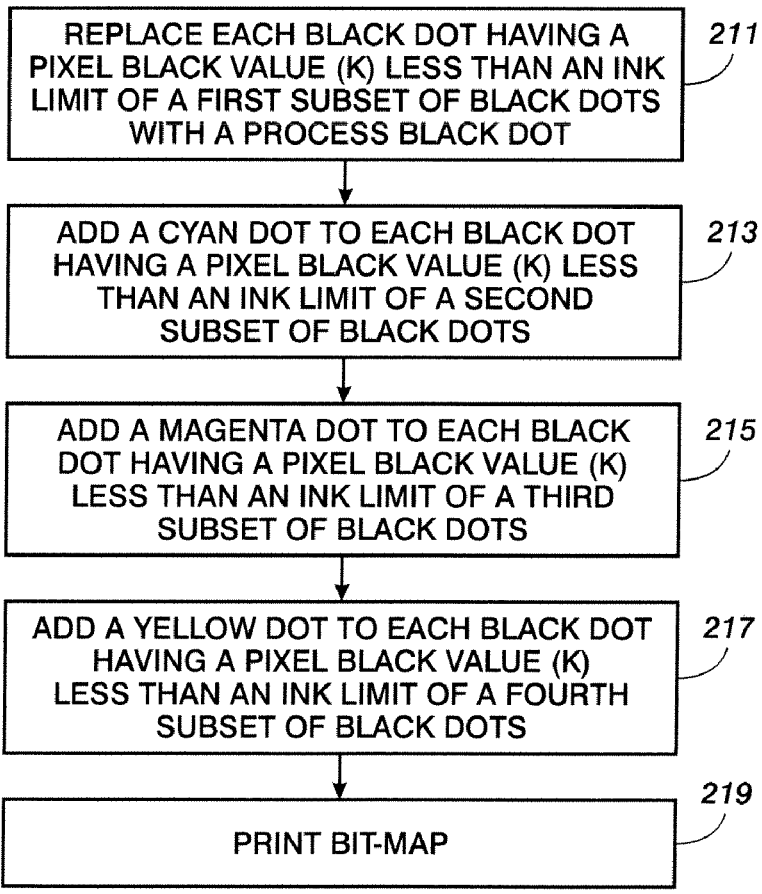
FIG. 5 is a schematic flow diagram of an embodiment of another procedure for printing black pixels; and, FIG. 6 is a schematic illustration of an embodiment of a halftone threshold array that can be associated with the pixel array of FIG. 3.

FIG. 5 is a schematic flow diagram of an embodiment of a procedure for printing black pixels. At 211 each of the black dots having a pixel black value (K) less than an ink limit of a first subset of the black dots of a bit map for a predetermined area is replaced with a process black dot. At 213 a cyan dot is added to each of the black dots having a pixel black value (K) less than an ink limit of a second subset of the black dots of the bit map for the predetermined area. At 215 a magenta dot is added to each of the black dots having a pixel black value (K) less than an ink limit of a third subset of the black dots of the bit map for the predetermined area. At 217 a yellow dot is added to each of the black dots having a pixel black value (K) less than an ink limit of a fourth subset of the black dots of the bit map for the predetermined area. At 219 the bit map is printed.

The black dots of the first subset (which are replaced with process black dots) can comprise a percentage of all the black dots that tends to generally decrease as the ratio of black coverage to total coverage in the predetermined area increases. Also, the black dots of the second through fourth subsets (to which a cyan, magenta or yellow dot is added) can comprise a percentage of all the black dots that tends to generally increase as the ratio of black coverage to total coverage in the predetermined area increases.

By way of illustrative example, the first, second, third and fourth subsets can be mutually exclusive so as to be non-overlapping. In other words, each subset comprises black dots that are not in any of the other subsets. Also, the combination of the first through fourth subsets can comprise all or less than all of the black dots, whereby some of the black dots are not replaced with black dots and do not have a non-black dot added thereto.

The black dots that are replaced with process black dots can be generally uniformly distributed. Similarly, the black dots to which cyan dots are added can be generally uniformly distributed. Also, the black dots to which magenta dots are added can be generally uniformly distributed, and the black dots to which yellow dots are added can be generally uniformly distributed.

By way of illustrative example, determining whether a black dot is replaced with a process black dot or has a cyan, magenta or yellow dot added to it can be accomplished by halftoning continuous tone print data wherein each of the black values in the corresponding continuous tone data has been replaced with (a) a black plus cyan value kc, (b) a black plus magenta value km, (c) a black plus yellow value ky, wherein the sum of kc, km, ky has been determined as a function of the relative amount or coverage of black in the continuous tone data, e.g., the ratio of black coverage to total color coverage, and (d) a process black value cmy that comprises the difference between the black value and the sum of the black plus cyan value, the black plus magenta value, and the black plus yellow value.

The process black value cmy can be determined as described previously relative to the procedure of FIG. 4 (e.g., cmy=bk−KCMY).

The black plus cyan value kc, the black plus magenta value km and the black plus yellow value ky can be determined by first determining a black plus non-black value KCMY as described previously relative to the procedure of FIG. 4 (e.g., kmcy=TABLE [BK_SCALED]), and then dividing that value into sub-values, one each for cyan, magenta and yellow. By way of illustrative example, the black plus cyan value kc, the black plus magenta value km and the black plus yellow value ky can be equal, such that:

$$kc=km=ky=KCMY/3$$

The values cmy, KCMY, kc, km, ky can be expressed as percentages or scalars, depending upon implementation. For example, these values can be scaled to [0, 255] for an implementation wherein color values (e.g., bk, cm, cy, my, c, m, y) are in the range of 0 to 255.

FIG. 6 schematically illustrates an embodiment of a stochastic halftone threshold value that can be employed as follows for the illustrative example wherein the color values, the values cmy, kc, km, ky and the threshold values are scaled to the same range such as [0, 255], and wherein t is the threshold predeterminable value:

```
if cmy>t C, M Y dots are on
else if cmy+ck>t K, C dots are on
else if cmy+ck+mk>t K, M dots are on
else if cmy+ck+mk+yk>t K, Y dots are on
else if cmy+ck+mk+yk+cm>t C, M dots are on
else if cmy+ck+mk+yk+cm+cy>t C, Y dots are on
else if cmy+ck+mk+yk+cm+cy+my>t M, Y dots are on
else if cmy+ck+mk+yk+cm+cy+my+c>t C dot is on
else if cmy+ck+mk+yk+cm+cy+my+c+m>t M dot is on
else if cmy+ck+mk+yk+cm+cy+my+c+m+y>t Y dot is on
else no dot is on (white dot).
```

Pursuant to the foregoing, replacement process black dots can be printed at pixel locations having associated threshold values in the range of 0 to cmy−1, and black dots to which cyan are added can be printed at pixel locations having associated threshold values in the range of cmy to cmy+kc−1. Black dots to which magenta dots are added can be printed at pixel locations having associated threshold values in the range of cmy+kc to cmy+kc+km−1, and black dots to which yellow dots are added can be printed at pixel locations having associated threshold values in the range of cmy+kc+km to cmy+kc+km+ky−1, for example. In this manner, for an area of uniform color, the black plus cyan value kc generally represents the portion of black dots in the area to which cyan dots are added, the black plus magenta value km generally represents the portion of black dots in the area to which magenta dots are added, the black plus yellow value ky generally represents the portion of black dots in the area to which yellow dots are added, the process black value cmy represents the portion of black dots in the area that are replaced with process black dots. To the extent that kc, km, ky and cmy are scalars in the range [0, (predeterminable value)], kc/(predeterminable value) would be the fraction of black dots to which cyan dots are added, km/(predeterminable value) would be the fraction of black dots to which magenta dots are added, ky/(predeterminable value) would be the fraction of black dots to which yellow dots are added, and cmy/(predeterminable value) would be the fraction of black dots that are replaced with process black dots.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of printing comprising:
    setting a pixel black value of K for an ink limit;
    identifying each of black dots of a first subset of black dots having pixel black value K greater than the ink limit, and pixel color value of cyan, magenta, and yellow equal to zero;
    rendering only K for a pixel value for the first subset of black dots;
    replacing each of black dots of a second subset of black dots of a halftoned bit map for a predetermined area with a process black dot;
    adding a non-black dot to each of black dots of a third subset of black dots of the bit-mapped data, wherein the halftoned bit map is generated by halftoning continuous tone data;
    wherein the black dots of the third subset comprises a percentage of all the black dots that tends to generally increase as a ratio of black coverage to total coverage in the predetermined area increases;
    wherein the first, second, and third subset comprises black dots that are mutually exclusive; and,
    printing the bit map.

2. The method of claim 1 wherein the first subset, the second subset, and the third subset comprise all of the black pixels in the bit map.

3. The method of claim 1 wherein the ink limit value is a value set at a predeterminable percentage of a fully on value.

4. The method of claim 1 wherein the black dots of the second subset are generally uniformly distributed.

5. The method of claim 1 wherein: the black dots of the first subset are generally uniformly distributed, and the black dots of the second subset are generally uniformly distributed.

6. A method of printing comprising:
    setting a pixel black value of K for an ink limit;
    identifying each of black dots of a first subset of black dots having pixel black value K greater than the ink limit, and pixel color value of cyan, magenta, and yellow equal to zero;
    rendering only K for a pixel value for the first subset of black dots;
    replacing each of black dots of a second subset of black dots of a bit map for a predetermined area with a process black dot;
    adding a non-black dot to each of black dots of a third subset of black dots of the bit-mapped data;
    wherein the first, second, and third subset comprise black dots that are in mutually exclusive subsets; and,
    printing the bit map.

7. The method of claim 6 wherein the first subset, the second subset, and the third subset comprise all of the black dots in the bit map.

8. The method of claim 6 wherein the ink limit value is predeterminable.

9. The method of claim 6 wherein the ink limit value is a value set at a predeterminable percentage of a fully on value.

10. The method of claim 6 wherein:
    the black dots of the first subset are generally uniformly distributed;
    the black dots of the second subset are generally uniformly distributed; and,
    the black dots of the third subset are generally uniformly distributed.

11. A method of printing comprising:
    setting a pixel black value of K for an ink limit;
    identifying each of black dots of a first subset of black dots having pixel black value K greater than the ink limit, and pixel color value of cyan, magenta, and yellow equal to zero;
    rendering only K for a pixel value for the first subset of black dots;
    replacing each of black dots of a second subset of black dots of a halftoned bit map for a predetermined area with a process black dot;
    adding at least a cyan dot to each of black dots of a third subset of black dots of the halftoned bit-map;
    adding at least a magenta dot to each of black dots of a fourth subset of black dots of the halftoned bit-map;

adding at least a yellow dot to each of black dots of a fifth subset of black dots of the halftoned bit-map;

wherein the halftoned bit map is generated by halftoning continuous tone data;

wherein the black dots of the third subset, the fourth subset and the fifth subset comprises a percentage of all the black dots that tends to generally increase as a ratio of black coverage to total coverage in the predetermined area increases; and, printing the bit map.

12. The method of claim 11 wherein the first through fifth subsets comprise all of the black dots in the bit map.

13. A method of printing comprising:

modifying continuous tone data for a predetermined area such that halftoning of the modified continuous tone data produces a halftoned bit map wherein:

a pixel black value of K for an ink limit is set;

each of black dots of a first subset of black dots is identified having pixel black value K greater than the ink limit, and pixel color value of cyan, magenta, and yellow equal to zero;

rendering only K for a pixel value for the first subset of black dots;

each of black dots of a second subset of black dots is replaced with a process black dot;

a cyan dot is added to each of black dots of a third subset of black dots;

a magenta dot is added to each of black dots of a fourth subset of black dots;

a yellow dot is added to each of black dots of a fifth subset of black dots;

halftoning the modified continuous tone data to produce halftoned bit map; and, printing the bit map.

* * * * *

UNITED STATES PATENT AND TRADEMARK OFFICE
CERTIFICATE OF CORRECTION

Page 1 of 1

PATENT NO. : 8,068,257 B2
APPLICATION NO. : 12/390583
DATED : November 29, 2011
INVENTOR(S) : Xing Li et al.

It is certified that error appears in the above-identified patent and that said Letters Patent is hereby corrected as shown below:

Title Page; should read;

Line (73) Assignee: Xerox Corporation, Norwalk, CT (US)

Signed and Sealed this
Twenty-sixth Day of June, 2012

David J. Kappos
*Director of the United States Patent and Trademark Office*